US008205339B2

(12) United States Patent
Sakashita

(10) Patent No.: US 8,205,339 B2
(45) Date of Patent: Jun. 26, 2012

(54) METHOD FOR MANUFACTURING NOZZLE SUBSTRATE, AND METHOD FOR MANUFACTURING DROPLET DISCHARGE HEAD

(75) Inventor: Tomoki Sakashita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 250 days.

(21) Appl. No.: 12/706,286

(22) Filed: Feb. 16, 2010

(65) Prior Publication Data

US 2010/0229390 A1 Sep. 16, 2010

(30) Foreign Application Priority Data

Mar. 10, 2009 (JP) ................................ 2009-056036

(51) Int. Cl.
*B23P 17/00* (2006.01)

(52) U.S. Cl. ........................................ 29/890.1; 347/47

(58) Field of Classification Search ................. 29/890.1; 347/47

See application file for complete search history.

(56) References Cited

U.S. PATENT DOCUMENTS 8,136,920 B2 * 3/2012 Sakurai et al. .................. 347/47
2008/0155818 A1 * 7/2008 Nomoto .......................... 29/829
2008/0211871 A1 9/2008 Sakurai et al.

FOREIGN PATENT DOCUMENTS

JP 2008-155591 A 7/2008

* cited by examiner

*Primary Examiner* — Derris Banks
*Assistant Examiner* — Azm Parvez
(74) *Attorney, Agent, or Firm* — Global IP Counselors, LLP

(57) ABSTRACT

A method for manufacturing a nozzle substrate includes forming a first hollow recess in a first surface of a silicon substrate, forming a liquid-resistant protective film on the first surface of the silicon substrate including an inner wall of the first hollow recess, forming a second hollow recess in a first surface of a glass substrate, bonding the first surfaces of the silicon substrate and the glass substrate by anodic bonding, reducing a thickness of the glass substrate from a second surface until an aperture is formed in a bottom surface of the second hollow recess to form a second nozzle hole disposed on a droplet feed side, and reducing a thickness of the silicon substrate from a second surface until an aperture is formed in a bottom surface of the first hollow recess to form a first nozzle hole disposed on a droplet discharge side.

8 Claims, 9 Drawing Sheets

METHOD FOR MANUFACTURING NOZZLE SUBSTRATE, AND METHOD FOR MANUFACTURING DROPLET DISCHARGE HEAD

CROSS-REFERENCE TO RELATED APPLICATIONS

This application claims priority to Japanese Patent Application No. 2009-056036 filed on Mar. 10, 2009. The entire disclosure of Japanese Patent Application No. 2009-056036 is hereby incorporated herein by reference.

BACKGROUND

1. Technical Field

The present invention relates to a method for manufacturing a nozzle substrate for discharging ink or another liquid, and a method for manufacturing a droplet discharge head provided with the nozzle substrate.

2. Related Art

There is a conventionally known droplet discharge head for discharging droplets that has a layered structure in which the following three substrates are superimposed in sequence: a nozzle substrate in which a plurality of nozzle holes for discharging droplets is formed; a cavity substrate in which a flow channel for a discharge chamber or the like for holding droplets and in which bottom surface constitutes a vibration plate; and an electrode substrate which is disposed facing the vibration plate via a gap and in which a discrete electrode for driving the vibration plate is formed. In this type of droplet discharge head, the nozzle substrate and the cavity substrate are ordinarily composed of silicon substrates, the electrode substrate is composed of a glass substrate, the nozzle substrate and the cavity substrate are bonded using an adhesive, and the cavity substrate and the electrode substrate are bonded using anodic bonding.

In recent years, the range of use of droplet discharge heads has expanded beyond document printing and photo printing to industrial and commercial uses. In accordance with this, various types of discharge fluids are used, and the properties of such fluids are varied. In a droplet discharge head having a layered structure, an adhesive is used for bonding the nozzle substrate and the cavity substrate as described above. Therefore, the adhesive dissolves into the discharge fluid and affects the discharge fluid, thereby limiting the physical properties of discharge fluids that can be used.

In view of the above, a nozzle substrate in which the cavity substrate can be bonded without the use of an adhesive has been proposed in the art (e.g., see Japanese Laid-Open Patent Application No. 2008-155591 (FIG. 2)). With this technique, the nozzle substrate is composed of a SOI layer (a configuration in which a silicon layer is bonded to the two surfaces of a silicon oxide layer), and the surface that bonds with the cavity substrate is the glass layer, thereby making anodic bonding with the silicon substrate possible.

SUMMARY

In the technique of Japanese Laid-Open Patent Application No. 2008-155591 noted above, the nozzle substrate has a layered structure having a SOI layer and a glass layer, and since the SOI layer as such is a three-layer structure, the structure is essentially a four-layer structure. Therefore, there is a problem in that the manufacturing step is more complicated.

The present invention was contrived in view of the above, and an object thereof is to provide a method for manufacturing a nozzle substrate, and a method for manufacturing a droplet discharge head that make it possible to manufacture in a simple manner a nozzle substrate that can be bonded by anodic bonding to a cavity substrate in which a droplet flow channel of the droplet discharge head is formed.

A method for manufacturing a nozzle substrate according to a first aspect includes forming a first hollow recess in a first surface of a silicon substrate, forming a liquid-resistant protective film having liquid-resistant properties on an entire surface of the first surface of the silicon substrate including an inner wall of the first hollow recess, forming a second hollow recess in a first surface of a glass substrate, bonding the first surface of the silicon substrate and the first surface of the glass substrate by anodic bonding so that the first hollow recess and the second hollow recess face each other, reducing a thickness of the glass substrate from a second surface of the glass substrate until an aperture is formed in a bottom surface of the second hollow recess to form a second nozzle hole disposed on a droplet feed side of the nozzle substrate, and reducing a thickness of the silicon substrate from a second surface of the silicon substrate until an aperture is formed in a bottom surface of the first hollow recess to form a first nozzle hole disposed on a droplet discharge side of the nozzle substrate.

In this manner, the manufacturing steps can be simplified in comparison with a conventional nozzle substrate essentially having a four-layer structure because the silicon substrate and the glass substrate are anodically bonded to form a two-layer structure. Since bonding is carried out by anodic bonding without the use of an adhesive, it is possible to manufacture a nozzle substrate 1 in which various liquids can be used as the discharge fluid.

A nozzle hole can be formed with good precision because a first nozzle hole on the droplet discharge side is formed in the silicon substrate.

In the method for manufacturing a nozzle substrate according to a second aspect, the reducing of the thickness of the silicon substrate is preferably performed in a state in which a support substrate is affixed to the second surface of the glass substrate The silicon substrate can thereby be prevented from cracking during the manufacturing process.

In the method for manufacturing a nozzle substrate according to a third aspect, the reducing of the thickness of the glass substrate preferably includes reducing the thickness of the glass substrate to a prescribed thickness that allows the glass substrate to act as a support substrate when the thickness of the silicon substrate is reduced. The reducing of the thickness of the silicon substrate is preferably performed in a state in which the glass substrate acts as the support substrate.

Accordingly, a support substrate is not required when the thickness of the silicon substrate is reduced, and the manufacturing process can be simplified. Double-sided tape and adhesive tape for attaching the support substrate are not required, and the pressure-sensitive adhesive of the tape or the paste of the adhesive can be completely prevented from adhering and forming foreign matter.

The method for manufacturing a nozzle substrate according to a fourth aspect preferably further includes forming a liquid-resistant protective layer on the second surface of the silicon substrate after the thickness of the silicon substrate is reduced, and forming a liquid-repellent film on an exposed surface of the liquid-resistant protective layer formed on the silicon substrate.

A nozzle substrate that has durability in relation to ink and the effect of preventing droplets from remaining on the discharge surface (the other surface of the silicon substrate) can thereby be manufactured. It is possible to obtain a nozzle substrate that can provide good discharge characteristics without flight deflection due to the effect of preventing droplets from remaining on the discharge surface.

In the method for manufacturing a nozzle substrate according to a fifth aspect, the forming of the first hollow recess preferably includes forming the first hollow recess in a cylindrical shape and the forming of the second hollow recess includes forming the second hollow recess in a cylindrical shape, with the first hollow recess having a smaller diameter than the second hollow recess so that a nozzle hole having the first nozzle hole and the second nozzle hole is formed in a cross-sectional stepped shape in which a cross-sectional area decreases in a stepwise fashion from the droplet feed side toward the droplet discharge side.

A nozzle substrate capable of displaying stable droplet discharge characteristics can thereby be manufactured.

In the method for manufacturing a nozzle substrate according to a sixth aspect, the reducing of the thickness of the silicon substrate preferably includes grinding the silicon substrate from the second surface of the silicon substrate.

Thus, the thickness of the silicon substrate can be reduced by grinding.

In the method for manufacturing a nozzle substrate according to a seventh aspect, the reducing of the thickness of the silicon substrate preferably includes wet etching the silicon substrate from the second surface of the silicon substrate.

Thus, the thickness of the silicon substrate can be reduced by wet etching.

A method according to an eighth aspect is a method for manufacturing a droplet discharge head having a nozzle substrate including a plurality of nozzle holes for discharging droplets, a cavity substrate including a plurality of pressure chambers for accommodating droplets with the pressure chambers respectively communicating with the nozzle holes of the nozzle substrate, and a pressure generation unit that imparts pressure variation to the pressure chambers to cause the droplets to fly out. The method includes forming the nozzle substrate according to any of first to seventh aspects of the method for manufacturing a nozzle substrate, and bonding the nozzle substrate and the cavity substrate by anodic bonding.

A droplet discharge head can thereby be manufactured without the use of an adhesive.

BRIEF DESCRIPTION OF THE DRAWINGS

Referring now to the attached drawings which form a part of this original disclosure.

DETAILED DESCRIPTION OF EXEMPLARY EMBODIMENTS

Embodiments of a droplet discharge head provided with a nozzle substrate manufactured using the method for manufacturing a nozzle substrate according to the present invention will be described below with reference to the drawings. An electrostatically driven inkjet head is described hereinbelow with reference to FIGS. 1 and 2 as an example of a droplet discharge head. The actuator (pressure-generating means) is not limited to an electrostatic drive scheme, and also possible are schemes that make use of a piezoelectric element, a heater element, or the like.

Embodiment 1

Figure 1:
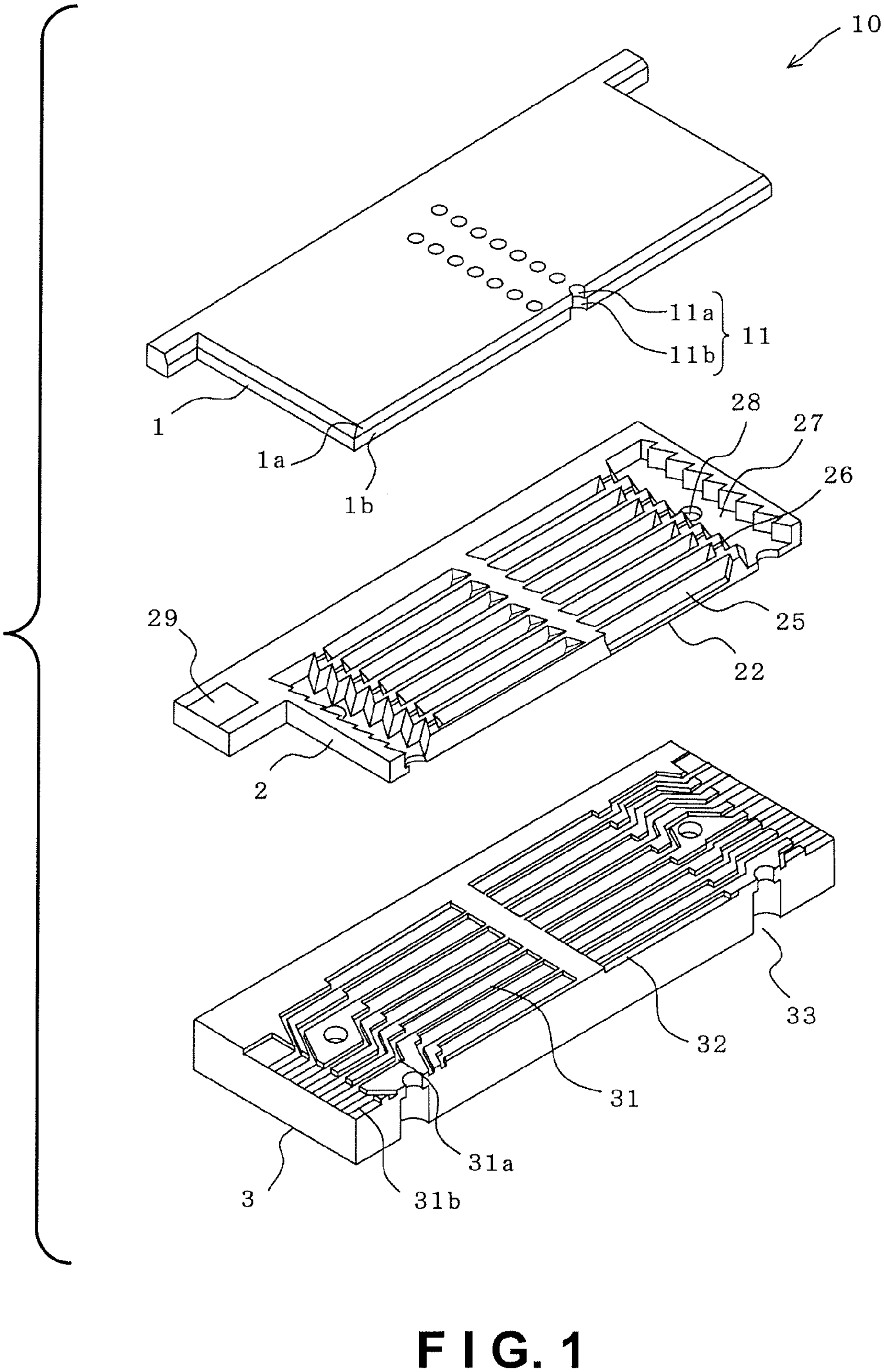
FIG. 1 is an exploded perspective view of a droplet discharge head provided with a nozzle substrate manufactured using the method for manufacturing a nozzle substrate of embodiment 1.
Figure 2:
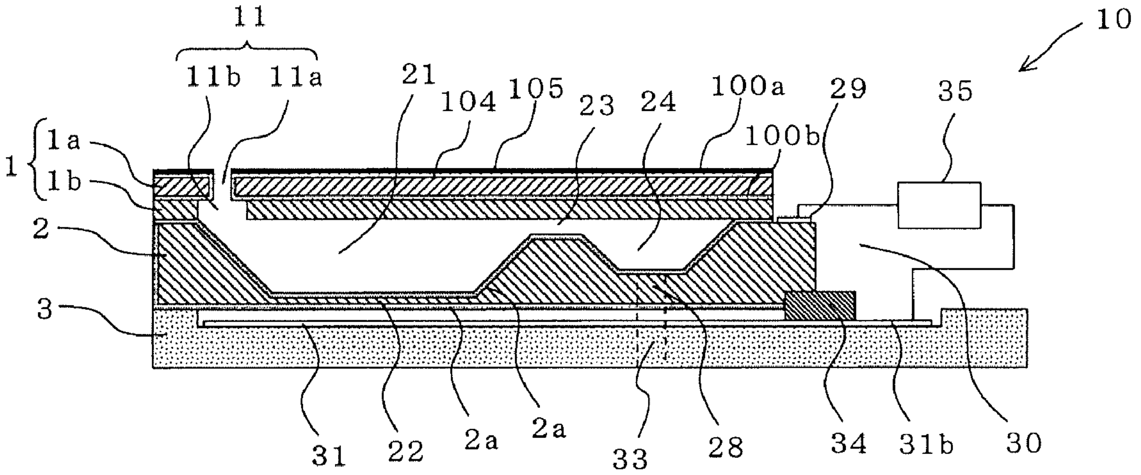
FIG. 2 is a cross-sectional view in the lengthwise direction of the inkjet head 10 of FIG. 1.

FIG. 1 is an exploded perspective view of a droplet discharge head according to embodiment 1 of the present invention. FIG. 2 is a cross-sectional view in the lengthwise direction of the inkjet head of FIG. 1. The size relationship of the constituent elements in FIG. 1 and in the other drawings thereafter may be different that that of the actual constituent elements in order to facilitate the illustration and viewing of the constituent elements. The terms "upper side" and "lower side" as used in reference to the drawings refer to above and below, respectively; the direction in which the nozzles are aligned is referred to as the "crosswise direction"; and the direction perpendicular to the crosswise direction is referred to as the "lengthwise direction."

The inkjet head 10 of the present embodiment has a nozzle substrate 1, a cavity substrate 2, and an electrode substrate 3; and has a three-layer structure in which these three substrates are superimposed and bonded in the listed order, as shown in FIGS. 1 and 2. These three substrates are all bonded by anodic bonding.

The configuration of the substrates is described in greater detail below.

The nozzle substrate 1 has a two-layer structure in which a silicon substrate 1*a* and a glass substrate 1*b* are anodically bonded, and has a thickness of about, e.g., 50 μm. A plurality of nozzle holes 11 for discharging ink droplets is provided to the nozzle substrate 1 at a predetermined pitch, and in this case, two nozzle rows are formed. The nozzle holes 11 are composed of cylindrical first nozzle holes 11*a* at the distal end (ink discharge side) in the discharge direction, and cylindrical second nozzle holes 11*b* having a larger diameter than the first nozzle holes 11*a*; and the first nozzle holes 11*a* and the second nozzle holes 11*b* are coaxially arranged. This configuration makes it possible to align the discharge direction of the ink droplets in the center axis direction of the nozzle holes 11, and stable ink discharge characteristics can be demonstrated. In other words, the flight direction of the ink droplets does not exhibit nonuniformity, the ink droplets do not scatter, and nonuniformity of the discharge quantity of the ink droplets can be reduced.

The first nozzle holes 11*a* on the ink discharge side are formed on the silicon substrate 1*a*, and the second nozzle holes 11*b* on the ink feed side are formed in the glass substrate 1*b*. The first nozzle holes 11*a* having discharge apertures require greater precision in comparison with the second nozzle holes 11*b* because the ink droplet quantity to be discharged is affected and because of other factors. For this reason, the first nozzle holes 11*a* are formed in the silicon substrate 1*a* in which holes can be formed with high precision by photolithography. In this configuration, the first nozzle holes 11*a* are formed by holes that pass rectilinearly through the silicon substrate 1*a*, but may be formed in a cross-sectional stepwise shape in which the cross-section area decreases in a stepwise fashion from the second nozzle holes 11*b* toward the discharge aperture. In this case, the diameter of the second nozzle holes 11*b* is set so that the nozzle holes 11 have a cross-sectional stepwise shape overall.

The nozzle substrate 1 configured in this manner can be anodically bonded to the cavity substrate 2 because the surface to be bonded to the cavity substrate 2 is the glass substrate 1*b*, and secure bonding is possible without the need of an adhesive.

An ink-resistant protective film 104 is formed on the silicon substrate 1*a* on the side having the first nozzle holes. The ink-resistant protective film 104 having ink-resistant properties is formed on at least a discharge surface 100*a* (second surface), an opposing surface 100*b* (first surface), and the inner wall of the first nozzle holes 11*a*; and the ink-resistant protective film 104 protects these surfaces from ink. Durability in relation to ink is thereby improved. An ink-repellent film 105 is furthermore formed as a liquid-repellent film on the ink-resistant protective film 104, which is formed on the discharge surface 100*a*. The ink-repellent film 105 has a configuration in which the edge of the discharge apertures of the nozzle holes 11 is used as a boundary, and is not formed on the opposing surface and the inner wall of the nozzle holes 11. Ink droplets are thereby prevented from remaining on the discharge surface 100*a*.

The cavity substrate 2 is fabricated from a silicon substrate having a thickness of about 140 μm. A hollow recess 25 that will serve as a pressure chamber 21, a hollow recess 26 that will serve as an orifice 23, and a hollow recess 27 that will serve as a reservoir 24 are formed by wet etching on the silicon substrate. A plurality of the hollow recesses 25 is formed independently in positions that correspond to the nozzle holes 11. Therefore, when the nozzle substrate 1 and the cavity substrate 2 are bonded together, as shown in FIG. 2, the hollow recesses 25 constitute pressure chambers 21, are in communication with the nozzle holes 11 in a respective manner, and are in communication with the orifices 23 in a respective manner. The bottom wall of the pressure chamber 21 (hollow recess 25) is a vibration plate 22.

The hollow recess 26 constitutes a narrow groove-shaped orifice 23, and the hollow recess 25 (pressure chamber 21) and the hollow recess 27 (reservoir 24) are in communication via the hollow recess 26.

The hollow recess 27 is used for storing ink or another liquid material, and constitutes the reservoir (shared ink chamber) 24, which is shared by each pressure chamber 21. The reservoir 24 (hollow recess 27) is in communication with all of the pressure chambers 21 via the orifices 23 in a respective manner, and an ink flow channel is formed by the pressure chamber 21, the reservoir 24, and the orifice 23. The orifice (hollow recess 26) 23 may also be provided to the back surface (the surface on the side bonded to the cavity substrate 2) of the nozzle substrate 1. An ink feed hole 28 is provided in the bottom part of the reservoir 24.

An insulating layer 2*a* composed of a $SiO_2$ or tetraethyl orthosilicate (TEOS, also known as tetraethoxysilane or ethyl silicate) film is formed to a thickness of 0.1 μm by thermal oxidation or plasma chemical vapor deposition (CVD) on the entire surface of the cavity substrate 2 and at least the surface facing the electrode substrate 3. The insulating layer 2*a* is provided with the aim of preventing dielectric breakdown and short-circuiting when the inkjet head 10 is driven.

The electrode substrate 3 is fabricated from a glass substrate having a thickness of about, e.g., 1 mm. Among glass substrates, it is suitable to use a borosilicate heat-resistant hard glass having a coefficient of thermal expansion approximate to that of the silicon substrate of the cavity substrate 2. This is due to the fact that stress generated between the electrode substrate 3 and the cavity substrate 2 can be reduced, allowing the electrode substrate 3 and the cavity substrate 2 to be durably bonded without peeling or other problems when the electrode substrate 3 and the cavity substrate 2 are anodically bonded together. This is because the coefficients of thermal expansion of the two substrates are close to each other.

Hollow recesses 32 are provided to the electrode substrate 3 in each position of the surface facing the vibration plates 22 of the cavity substrate 2. The hollow recesses 32 are formed to a depth of about 0.3 μm by etching. A discrete electrode 31 composed generally of indium tin oxide (ITO) is formed inside each hollow recess by sputtering in the hollow recesses 32 to a thickness of, e.g., 0.1 μm. The material of the discrete electrode 31 is not limited to ITO, and chromium or another metal or the like may be used, but ITO is generally used because ITO is transparent and makes it possible to readily confirm that a discharge has occurred.

The discrete electrode 31 has a lead part 31*a* and a terminal part 31*b* connected to a flexible wiring board (not shown). The terminal part 31*b* is exposed inside an electrode extraction part 30 in which the non-terminal part of the cavity substrate 2 is opened for wiring, as shown in FIG. 2.

An ink feed hole 33 connected to an external ink cartridge (not shown) is provided in the electrode substrate 3. The ink feed hole 33 is in communication with the ink feed hole 28 provided in the cavity substrate 2, and ink is fed from the ink cartridge (not shown) via the ink feed holes 28, 33. The ink fed from the ink cartridge (not shown) is fed to the pressure chamber 21 via the orifice 23 and the reservoir 24 that serve as an ink feed channel for supplying ink to the pressure chamber 21.

As described above, the nozzle substrate 1, the cavity substrate 2, and the electrode substrate 3 are usually separately fabricated, and the main unit of the inkjet head 10 is fabricated by bonding these substrates in the manner shown in FIG. 2. The open-end part of the electrode gap formed between the vibration plate 22 and the discrete electrode 31 is sealed by a sealant 34 composed of epoxy or another resin. Moisture, dust, and the like can thereby be prevented from entering into the electrode gap, and the reliability of the inkjet head 10 can be kept at a high level.

An IC driver or another drive control circuit 35 is connected to the terminal part 31*b* of each discrete electrode 31 and a shared electrode 29 disposed on the cavity substrate 2 via the flexible wiring board (not shown), as shown in simplified form FIG. 2, thereby forming the inkjet head 10.

The operation of the inkjet head 10 configured in the manner described above is next described.

The drive control circuit 35 oscillates at, e.g., 24 kHz, and feeds an electric charge to the discrete electrode 31 by applying a pulse voltage between the discrete electrode 31 and the shared electrode terminal 29 of the nozzle substrate 1. When the electric charge is fed to the discrete electrode 31 and positively electrified, the vibration plate 22 is negatively electrified and an electrostatic force is generated between the vibration plate 22 and the discrete electrode 31. The vibration plate 22 is drawn to the discrete electrode 31 and made to flex by the attraction force of the electrostatic force, and the volume of the pressure chamber 21 increases. A droplet of ink or the like stored inside the reservoir 24 is thereby forced to flow into the pressure chamber 21 through the orifice 23. Next, when the application of voltage to the discrete electrode 31 is stopped, the electrostatic force dissipates, the vibration plate 22 is restored, and the volume of the pressure chamber 21 rapidly contracts. The pressure inside the pressure chamber 21 is thereby rapidly increased, and a droplet of ink or the like is discharged from the nozzle holes 11 in communication with the pressure chamber 21.

Figure 3:
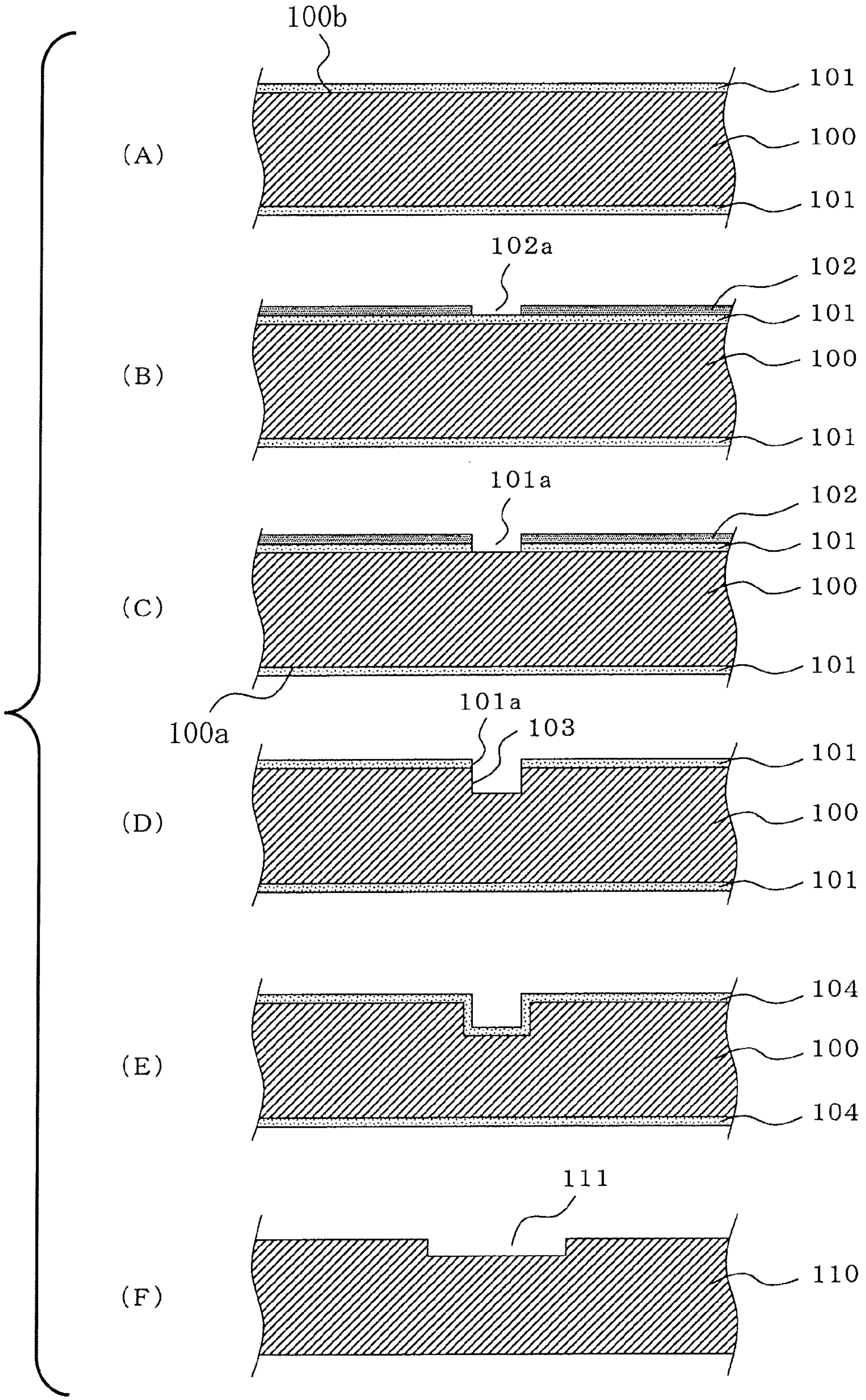
FIG. 3 is a cross-sectional view showing the steps for manufacturing the nozzle substrate 1 of embodiment 1.
Figure 4:
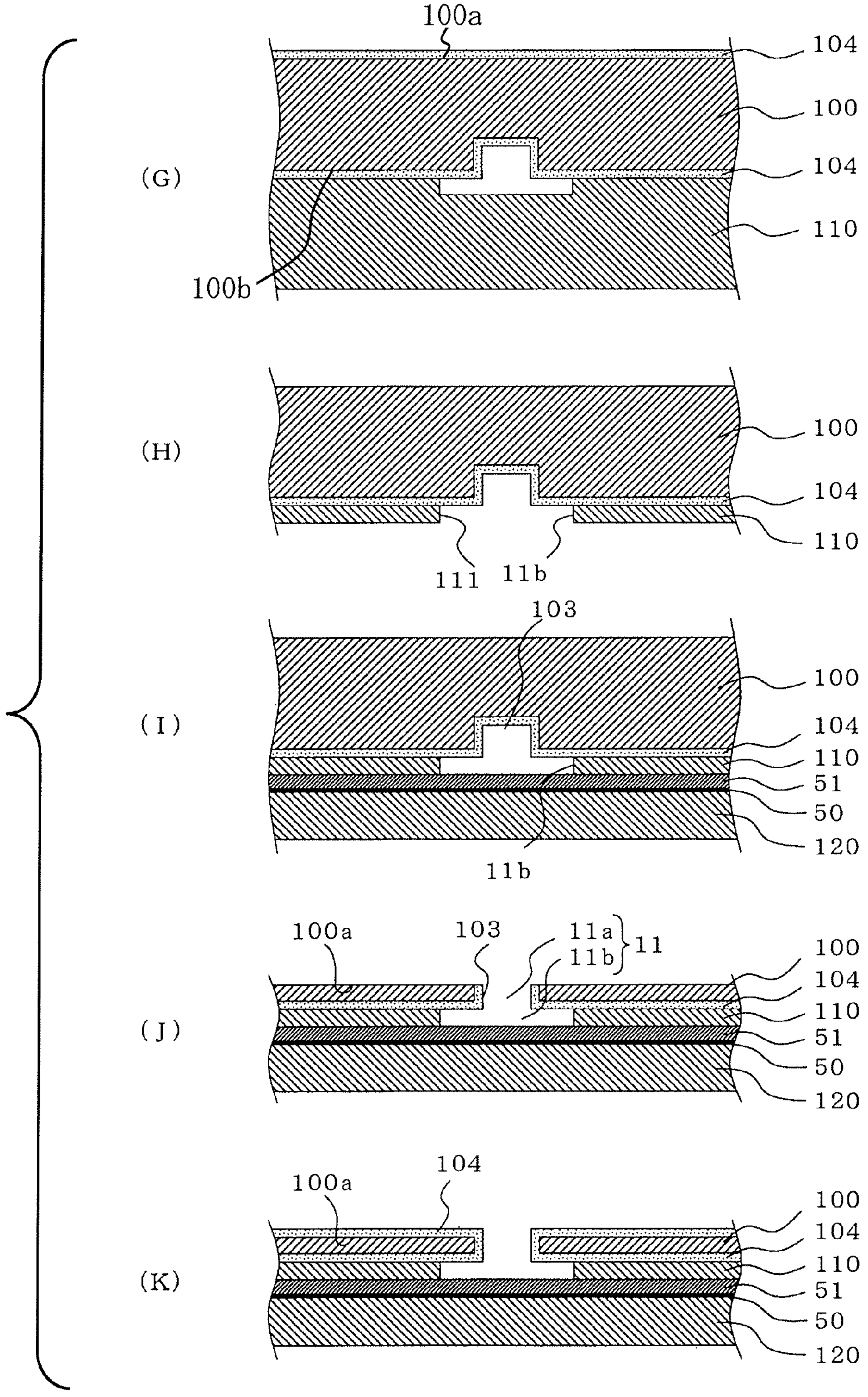
FIG. 4 is a cross-sectional view showing the steps for manufacturing the nozzle substrate 1 continued from FIG. 3.
Figure 5:
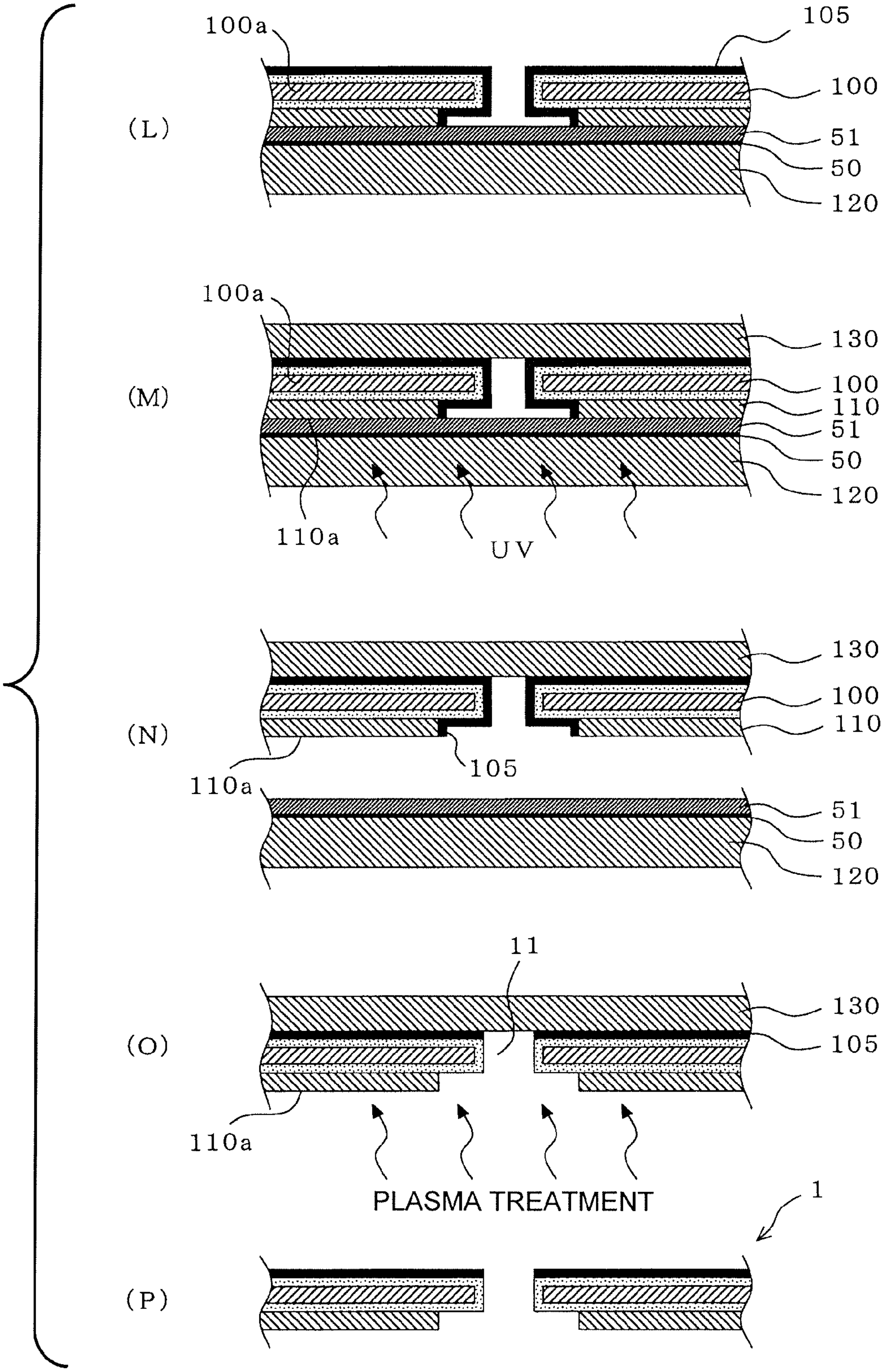
FIG. 5 is a cross-sectional view showing the steps for manufacturing the nozzle substrate 1 continued from FIG. 4.
Figure 6:
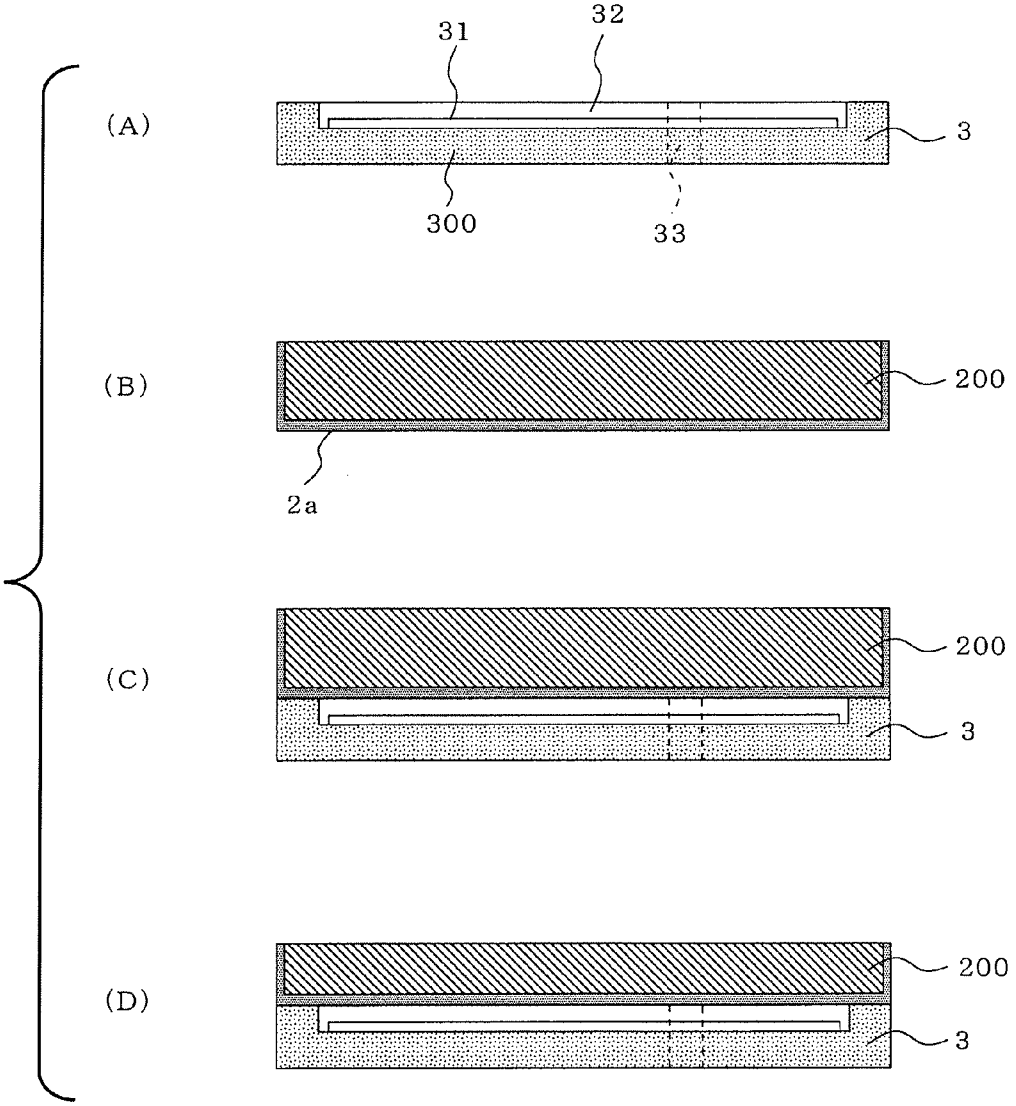
FIG. 6 is a cross-sectional view of the manufacturing steps showing the method for manufacturing the cavity substrate 2 and the electrode substrate 3.
Figure 7:
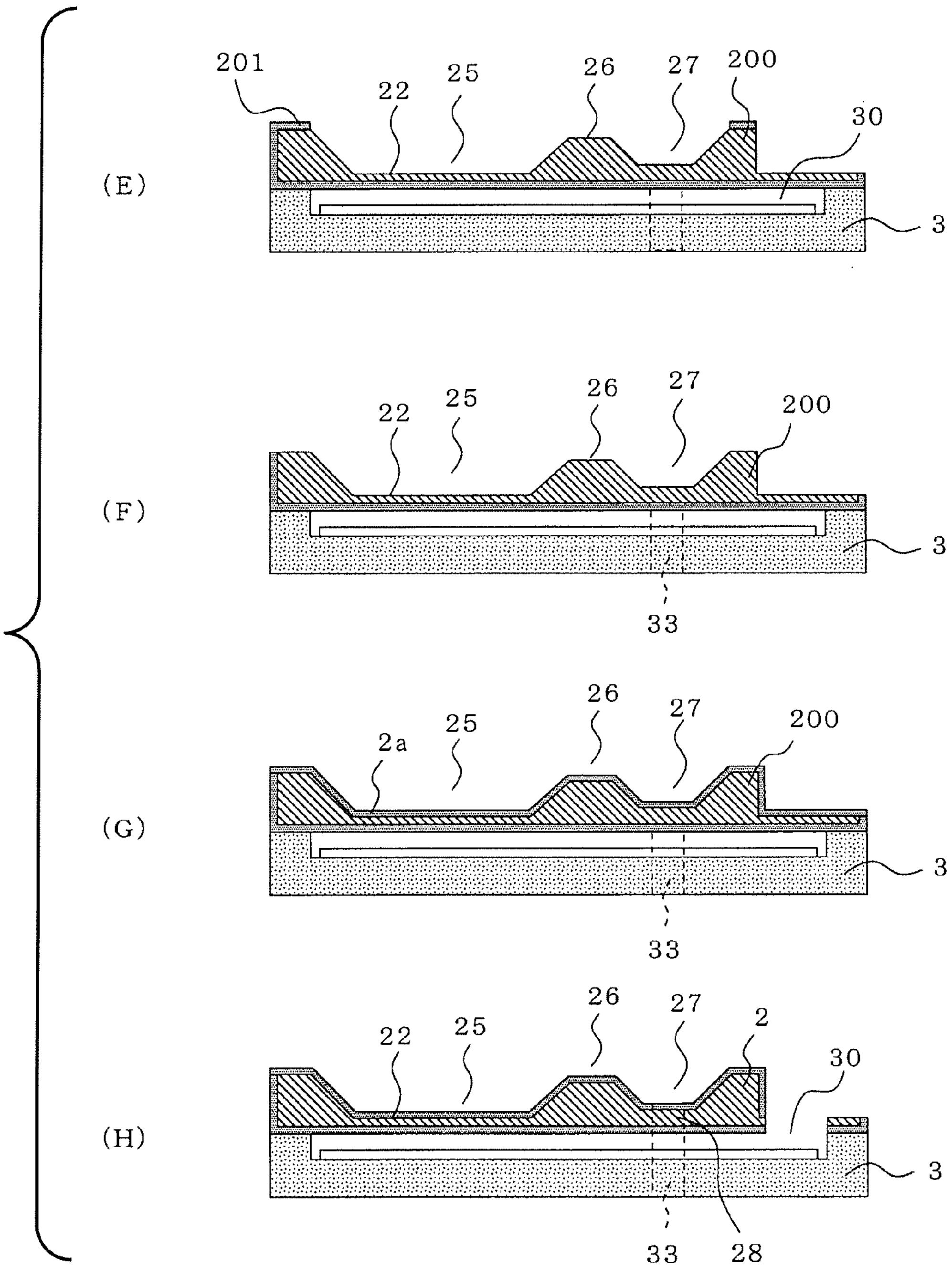
FIG. 7 is a cross-sectional view of the manufacturing steps continued from FIG. 6.

Next, the method for manufacturing the inkjet head 10 will be described with reference to FIGS. 3 to 7. FIGS. 3 to 5 are cross-sectional views showing the steps for manufacturing a nozzle substrate. FIGS. 6 and 7 are cross-sectional views of the manufacturing steps showing the method for manufacturing the cavity substrate 2 and the electrode substrate 3. In this case, the method for manufacturing the cavity substrate 2 after a silicon substrate 200 has been bonded to the electrode substrate 3 is mainly described.

First, the method for manufacturing the nozzle substrate 1 according to one embodiment will be described.

(1) Method for Manufacturing Nozzle Substrate 1

(A) First, a silicon substrate 100 having a thickness of 280 μm is prepared, placed in a thermal oxidation device (not shown), and subjected to a thermal oxidation treatment in a mixed atmosphere of oxygen and water vapor for an oxidation time of 4 hours at an oxidation temperature of 1075° C. to uniformly form a thermal oxide film ($SiO_2$ film) having a thickness of 1 μm on the surface of the silicon substrate 100, as shown in FIG. 3(A).

(B) Next, a resist 102 is coated onto the thermal oxide film 101 of the bonding surface (the surface to be bonded with the glass substrate 1*b* of the nozzle substrate 1) 100*b* of the silicon substrate 100, and portions 102*a* that will serve as the first nozzle holes are patterned onto the resist 102, as shown in FIG. 3(B).

(C) Next, the portions of the thermal oxide film 101 exposed through the portions 102*a* that will serve as the first nozzle holes are removed by etching with a buffered aqueous solution of hydrofluoric acid (1:6 aqueous solution of hydrofluoric acid: ammonium fluoride) to form apertures 101*a*, as shown in FIG. 3(C). The thermal oxide film 101 of the back surface 100*b* is used as an etching protective film of the opposing surface 100*b* during a subsequent ICP treatment step. Therefore, the thermal oxide film 101 at the back surface 100*b* is protected using tape, a resist, or the like prior to the etching step of step (C). The thermal oxide film 101 at the back surface 100*b* is thereby prevented from being removed in the etching step of step (C). The resist 102 is thereafter peeled away by washing with sulfuric acid, or by using another method.

(D) Next, the hollow recesses 101*a* of the thermal oxide film 101 are anisotropically etched in a perpendicular configuration using an ICP dry etching device (not shown) to a depth of, e.g., 40 μm to form hollow recesses 103 that will serve as first nozzle holes, as shown in FIG. 3(D). The etching gases used in this case are $C_4F_8$ and $SF_6$, and these etching gases can be used in alternating fashion. In this case, $C_4F_8$ is used for protecting the groove side surfaces so that etching does not progress to the side surfaces of the groove to be formed, and $SF_6$ is used for facilitating the etching in the direction perpendicular to the silicon substrate 100.

(E) Next, the thermal oxide film 101 remaining on the surface of the silicon substrate 100 is removed using a hydrochloric acid aqueous solution, and the silicon substrate 100 is thereafter placed in a thermal oxidation device (not shown) and subjected to a thermal oxidation treatment in a mixed atmosphere of oxygen and water vapor for an oxidation time of 2 hours and an oxidation temperature of 1000° C. to uniformly form a $SiO_2$ film as an ink-resistant protective film 104 having a thickness of 0.1 μm on the surface of the silicon substrate 100, as shown in FIG. 3(E). The ink-resistant protective film 104 is formed on the side surfaces and the bottom surface of the hollow recesses 103, which will serve as the first nozzle holes.

(F) Next, a glass substrate 110 having a substrate thickness of 0.5 mm to 1 mm is prepared, and hollow recesses 111 that will serve as second nozzle holes are formed on a first surface to a depth of, e.g., 35 μm by machining, as shown in FIG. 3(F).

(G) Next, the silicon substrate 100 shown in FIG. 3(E) and the glass substrate 110 of FIG. 3(F) are positioned at the mutually holed surfaces (first surfaces), as shown in FIG. 4(G); the interior of the chamber is heated to, e.g., 300° C.; and a voltage of 200 to 800 V is applied to perform anodic bonding.

(H) Next, the thickness of the bonded substrate at the glass substrate 110 is reduced to a desired thickness, e.g., 25 μm by grinding from a second surface of the glass substrate 110, as shown in FIG. 4(H). The bottom surfaces of the hollow recesses 111 that will serve as the second nozzle holes are thereby removed to form the second nozzle holes 11*b*.

(I) Next, a support substrate 120 is attached as a first support substrate composed of glass or another transparent material to the surface of the glass substrate 110 via a double-sided adhesive sheet 50, as shown in FIG. 4(I). Specifically, the surface of a self-peeling layer 51 of the double-sided adhesive sheet 50 affixed to the support substrate 120 is placed opposite the glass substrate 110 and is affixed to the substrate in a vacuum. This makes it possible to form a clean adhesion without air bubbles in the adhesion boundary. Air bubbles left in the adhesion boundary during this adhesion cause variability in the thickness when the thickness of the silicon substrate 100 is reduced by subsequent grinding in (J).

For example, Selfa BG (trademark of Sekisui Chemical Co., Ltd) may be used as the double-sided adhesive sheet 50. The double-sided adhesive sheet 50 is a sheet (self-peeling sheet) with a self-peeling layer 51, has an adhesive surface on both surfaces, and is furthermore provided with a self-peeling layer 51 on one surface. The adhesive strength of the self-peeling layer 51 is reduced by UV rays, heat, or other stimulation.

Since the support substrate 120 is affixed using the double-sided adhesive sheet 50 provided with a self-peeling layer 51 in this manner, the silicon substrate 100 and the support substrate 120 can be durably bonded and processed without damaging the silicon substrate 100 when the thickness of the silicon substrate 100 is reduced. The support substrate 120 can be readily peeled away from the silicon substrate 100 without residual paste after grinding as described hereinbelow.

(J) Next, the silicon substrate 100 is ground from the surface 100*a* using a grinder (not shown) to approximately reduce the thickness to the desired level, e.g., 50 μm, as shown in FIG. 4(J). The bottom surfaces of the hollow recesses 103 that will serve as the first nozzle holes are removed to form the first nozzle holes 11*a*. After the thickness has been reduced, the surface of the silicon substrate 100 is ground using a polisher and a CMP device to a predetermined thickness, e.g., 25 μm. The nozzle holes 11 are formed in the manner described above.

(K) Next, the ink-resistant protective film 104 is formed on the surface 100*a* (hereinafter referred to as discharge surface 100*a*) of the silicon substrate 100, as shown in FIG. 4(K). The ink-resistant protective film 104 also serves as an underfilm of the ink-repellent film 105 formed in the next step (L) and is composed of a metal oxide film. In this case, the ink-resistant protective film 104 is composed of, e.g., $SiO_2$ film, and is formed to a thickness of 0.1 using a sputtering device. The formation of the metal oxide film is not limited to sputtering as long as it is performed at a temperature (about 100° C.) that does not cause the self-peeling layer 51 to degrade. Other examples of the metal oxide film that may be used include a hafnium oxide film, tantalum oxide, titanium oxide, indium-tin oxide, and zirconium oxide. A film can be formed at a temperature that does not affect the self-peeling layer 51, and the method is not limited to sputtering. CVD or another technique may be used as long as adhesiveness to the silicon substrate 100 is assured.

(L) Next, the discharge surface 100*a* of the silicon substrate 100 is subjected to an ink-repellency treatment, as shown in FIG. 5(L). Specifically, a material having ink repellency and containing F atoms is formed as a film by vapor deposition or dipping to form an ink-repellent film 105 on the discharge surface 100*a*. At this point, the ink-repellent film 105 is also formed on the inner wall of the nozzle holes 11.

(M) Next, a support tape 130 is attached to the discharge surface 100*a*, and in this state UV rays are irradiated from the support substrate 120 side, as shown in FIG. 5(M).

(N) The self-peeling layer 51 of the double-sided adhesive sheet 50 is made to foam when irradiated with UV rays and is peeled away from the surface 100*a* of the glass substrate 110 to thereby remove the support substrate 120 from the glass substrate 110, as shown in FIG. 5(N).

(O) Oxygen or argon plasma treatment is carried out from the surface 110*a* of the glass substrate 110, and the ink-repellent film 105 of the inner walls of the nozzle holes 11 is destroyed is make the inner walls hydrophilic, as shown in FIG. 5(O).

(P) The substrates are lastly separated into desired chip sizes. Methods for achieving this include methods of cutting the substrates with a diamond wheel; methods of focusing laser light on the substrates, forming a reformed layer inside the substrates, and cutting the substrates; and the like. The support tape 130 is peeled away and the chips are thereafter washed using sulfuric acid or the like.

The nozzle substrate 1 can be fabricated in the manner described above.

In the present embodiment 1, a nozzle substrate 1 that can be bonded to the cavity substrate 2 by anodic bonding is thus manufactured by anodically bonding the silicon substrate 1*a* and the glass substrate 1*b* to form a two-layer structure. Therefore, the manufacturing steps can be simplified in comparison with a conventional nozzle substrate that essentially has a four-layer structure. Since anodic bonding is used rather than an adhesive, it is possible to manufacture a nozzle substrate 1 in which various liquids can be used as the discharge fluid.

The nozzle diameter can be formed with high precision because the first nozzle holes 11*a* that serve as discharge apertures are formed on the silicon substrate 1*a* side.

In the present embodiment 1, the hollow recesses 103 that will serve as the first nozzle holes 11*a*, and the hollow recesses 111 that will serve as the second nozzle holes 11*b* are formed in advance on the silicon substrate 1*a* (100) and the glass substrate 1*b* (110), respectively, and are then anodically bonded. The thickness of the substrates is reduced to thereby fabricate the nozzle substrate 1. In accordance with this method, it possible to prevent cracking during the manufacturing steps in comparison with the method in which the substrates are ground in advance and reduced to a desired thickness, and in which the nozzle holes are then formed and anodic bonding is carried out. Therefore, the nozzle substrate 1 can be manufactured with good yield. The silicon substrate 100 can be prevented from cracking in the manufacturing steps because the thickness of the silicon substrate 1*a* (100) is reduced by grinding in a state in which the support substrate 120 has been affixed.

The nozzle substrate 1 fabricated using the manufacturing method of the present embodiment 1 can be formed by anodic bonding with the cavity substrate 2. Therefore, an inkjet head 10 that uses this nozzle substrate 1 can be manufactured without the use of an adhesive. Accordingly, it is possible to manufacture an inkjet head 10 that can use a variety of discharge fluids.

Since the nozzle holes 11 are formed using a cross-sectional stepped shape having two or more steps, it is possible to obtain a nozzle substrate 1 in which nonuniformity of the flight direction of the ink droplets is eliminated, the ink droplets do no scatter, and variation in the discharge quantity of the ink droplets can be reduced In accordance with the above, the method for manufacturing a nozzle substrate as an aspect of the present invention has been described above, and the method for manufacturing the cavity substrate 2 and the electrode substrate 3 is next described.

(2) Method for Manufacturing Cavity Substrate 2 and Electrode Substrate 3

Hereinbelow, a method will be briefly described with reference to FIGS. 6 and 7 in which a silicon substrate 200 is bonded to the electrode substrate 3, and the cavity substrate 2 is manufactured from the silicon substrate 200.

The electrode substrate 3 is manufactured in the following manner.

(A) First, a hollow recess 32 is formed by etching with hydrofluoric acid using, e.g., a gold-chromium etching mask on a glass substrate 300 composed of borosilicate glass or the like having a thickness of about 1 mm. The hollow recess 32 has a groove shape that is slightly larger than the shape of the discrete electrode 31, and a plurality of hollow recesses is formed for each discrete electrode 31.

The discrete electrode 31 composed of ITO is formed in the hollow recess 32 by, e.g., sputtering.

The electrode substrate 3 is then fabricated by forming an ink feed hole 33 with a drill or the like.

(B) Next, the two sides of the silicon substrate 200 having a thickness of, e.g., 25 μm are mirror polished, after which a silicon oxide film (insulating film) 2*a* composed of TEOS is formed to a thickness of 0.1 μm by plasma CVD on one surface of the silicon substrate 200. A boron-doped layer for forming the vibration plate 22 to the desired thickness with high precision may be formed using an etching stop technique prior to the formation of the silicon substrate 200. Etching stop is defined as a state in which air bubbles has stopped being produced from the etching surface, and etching is determined to have stopped when the generation of air bubbles has stopped during actual wet etching.

(C) The silicon substrate 200 and the electrode substrate 3 fabricated as shown in FIG. 6(A) are heated to, e.g., 360° C.; an anode is connected to the silicon substrate 200; a cathode is connected to the electrode substrate 3; and a voltage of about 800 V is applied to carry out anodic bonding.

(D) After the silicon substrate 200 and the electrode substrate 3 have been anodically bonded, the thickness of the silicon substrate 200 is reduced to, e.g., 140 μM by etching the silicon substrate 200 in its bonded state using an aqueous solution of potassium hydroxide or the like.

(E) Next, a TEOS film 201 having a thickness of, e.g., 1.5 μm is formed by plasma CVD over the entire upper surface (the surface on the side opposite from the surface to which the electrode substrate 3 is bonded) of the silicon substrate 200, as shown in FIG. 7(E).

A resist for forming a hollow recess 25 that will serve as the pressure chamber 21, a hollow recess 26 that will serve as the orifice 23 and a hollow recess 27 that will serve as the reservoir 24 is patterned onto the TEOS film 201, and the TEOS film 201 in these portions is removed by etching.

The silicon substrate 200 is thereafter etched away using an aqueous solution of potassium hydroxide, thereby forming the hollow recess 25 that will serve as the pressure chamber 21, the hollow recess 26 that will serve as the orifice 23 and the hollow recess 27 that will serve as the reservoir 24. At this point, the portions in which the electrode extraction part 30 will be formed for wiring are also etched away to reduce the thickness. In the wet etching step of FIG. 7(E), it is possible to use an aqueous solution of 35-wt % potassium hydroxide initially, for example, and then to use an aqueous solution of 3-wt % potassium hydroxide. Accordingly, the surface roughness of the vibration plate 22 can be reduced.

(F) After the etching of the silicon substrate 200 has ended, the TEOS film 201 formed on the upper surface of the silicon substrate 200 is removed by etching with an aqueous solution of hydrofluoric acid.

(G) Next, a TEOS film (insulating layer 2*a*) is formed to a thickness of, e.g., 0.1 μM by plasma CVD on the surface of the silicon substrate 200 provided with the hollow recess 25 that will serve as the pressure chamber 21 and the like.

(H) Thereafter, the electrode extraction part 30 is opened by reactive ion etching (RIE) or the like. The bottom part of the hollow recess 27 that will serve as the reservoir 24 of the silicon substrate 200 is opened by laser machining from the ink feed hole 33 of the electrode substrate 3 to form the ink feed hole 28. The open-end part of the gap between the vibration plate 22 and the discrete electrode 31 is filled and sealed with epoxy or another sealant 34 (see FIG. 2). The shared electrode 29 is formed on the end part of the upper surface (the surface on the side to be bonded with the nozzle substrate 1) of the silicon substrate 200 by sputtering, as shown in FIG. 1.

As described above, the cavity substrate 2 is fabricated from the silicon substrate 200 while the substrate is bonded with the electrode substrate 3.

Lastly, the glass substrate 1*b* of the nozzle substrate 1 fabricated in the manner described above is bonded to the cavity substrate 2 to complete the inkjet head 10 shown in FIG. 1. Anodic bonding can be used for bonding the nozzle substrate 1 and the cavity substrate 2 together, and the inkjet head 10 can be manufactured without the use of an adhesive overall.

Embodiment 2

Embodiment 2 relates to a manufacturing method that does not require the support substrate 120 in the method for manufacturing the nozzle substrate 1 of embodiment 1. Mainly described below are the portions of embodiment 2 that are different from embodiment 1, and a redundant description of embodiment 1 is omitted.

Figure 8:
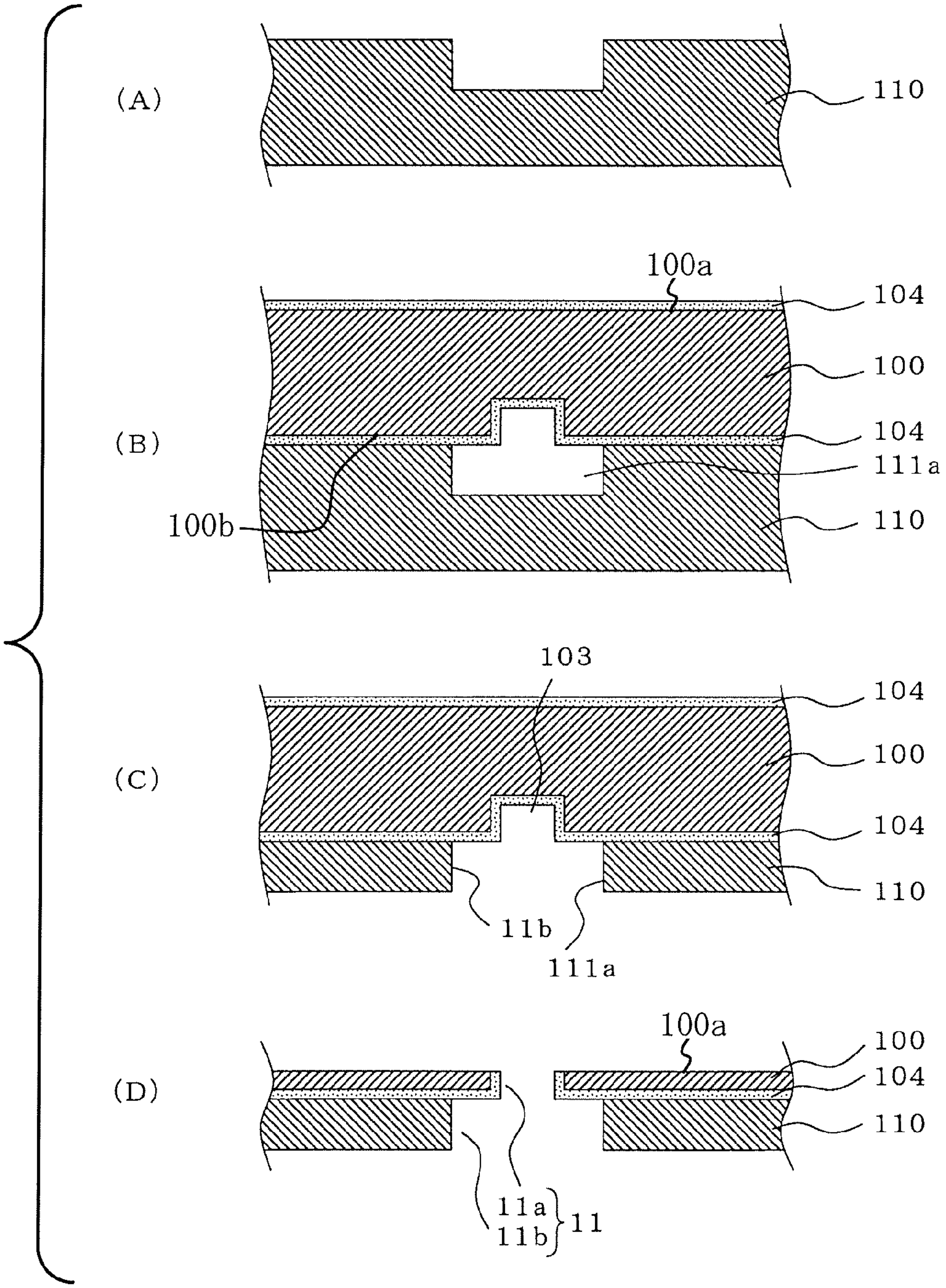
FIG. 8 is a cross-sectional view showing the steps for manufacturing the nozzle substrate 1 of embodiment 2.

FIG. 8 is a cross-sectional view showing the steps for manufacturing the nozzle substrate 1 of embodiment 2. In FIG. 8, the same reference numerals are used for the same portions as in FIGS. 3 to 5 of embodiment 1. The steps for manufacturing the silicon substrate 1*a* of the nozzle substrate 1 are the same as those of FIGS. 3(A) to (E).

(A) Hollow recesses 111*a* that will serve as the second nozzle holes are formed in the glass substrate 110, as shown in FIG. 8(A). The depth of the hollow recess 111*a* is, e.g., 100 μm to 200 μm.

(B) Next, the silicon substrate 100 shown in FIG. 3(E) and the glass substrate 110 of FIG. 8(A) are positioned at the mutually holed surfaces, as shown in FIG. 8(B); the interior of the chamber is heated to, e.g., 300° C.; and a voltage of 200 to 800 V is applied to perform anodic bonding.

(C) Next, the thickness of the bonded substrate on the side facing the glass substrate 110 is reduced to a desired thickness such as, e.g., 100 μm to 200 μm by grinding, as shown in FIG. 8(C). The bottom surfaces of the hollow recesses 111*a* that will serve as the second nozzle holes are thereby removed to form the second nozzle holes 11*b*.

(D) Next, the silicon substrate 100 is ground from the surface 100*a* using a grinder (not shown), as shown in FIG. 8(D). At this point, the support substrate 120 was used in embodiment 1, but in embodiment 2, the glass substrate 110 as such is used as a support substrate by setting the thickness of the glass substrate 110 to, e.g., 100 μm to 200 μm, as described above. Accordingly, the use of a separate support substrate is not required. For this reason, a double-sided tape or an adhesive sheet is not required to attach a support substrate, and the pressure-sensitive adhesive of the tape and the paste of the adhesive can be completely prevented from adhering and forming foreign matter.

In the grinding step, the thickness can be reduced to near the desired thickness; e.g., 50 μm. The bottom surfaces of the hollow recesses 103 that will serve as the first nozzle holes are thereby removed to form the first nozzle holes 11*a*. After the thickness has been reduced, the surface of the silicon substrate 100 is further ground using a polisher and a CMP device to a predetermined thickness; e.g., 25 μm. The nozzle holes 11 are thus formed.

Subsequent steps (the steps for forming the ink-resistant protective film 104 and the ink-repellent film 105) are the same as those of embodiment 1.

In the embodiment 2 as described above, the manufacturing steps are further simplified in comparison with embodiment 1 because the support substrate 120 is not required and the same effects as those in embodiment 1 can be obtained. The support substrate 120 can be peeled away from the glass substrate 110 by using UV irradiation to cause the self-peeling layer 51 of the double-sided adhesive sheet 50 to foam, but it is possible that some paste may be left behind. Residual paste leads to poor bonding when the cavity substrate 2 is bonded, and causes other problems, but since a support substrate 120 is not used in the manufacturing steps in the embodiment 2, the problems due to residual paste can be completely solved and productivity can be improved.

In the embodiments described above, grinding is used to reduce the thickness the silicon substrate 100 and the glass substrate 110, but no limitation is imposed thereby, and wet etching may be used to reduce the thickness.

In the embodiments described above, an example of a nozzle substrate used in an electrostatically driven inkjet head was described, but application can also be made to a nozzle substrate of an inkjet head that uses an actuator (pressure-generating means) of another scheme, such as a piezoelectric driving scheme, or a Bubble Jet (trademark) scheme.

A method for manufacturing a nozzle substrate in an inkjet head with a three-layer structure having a nozzle substrate, a cavity substrate, and an electrode substrate is described in the embodiments above, but the present invention can be applied to a method for manufacturing a nozzle substrate in an inkjet head with a four-layer structure having a nozzle substrate, a reservoir substrate, a cavity substrate, and an electrode substrate.

Figure 9:
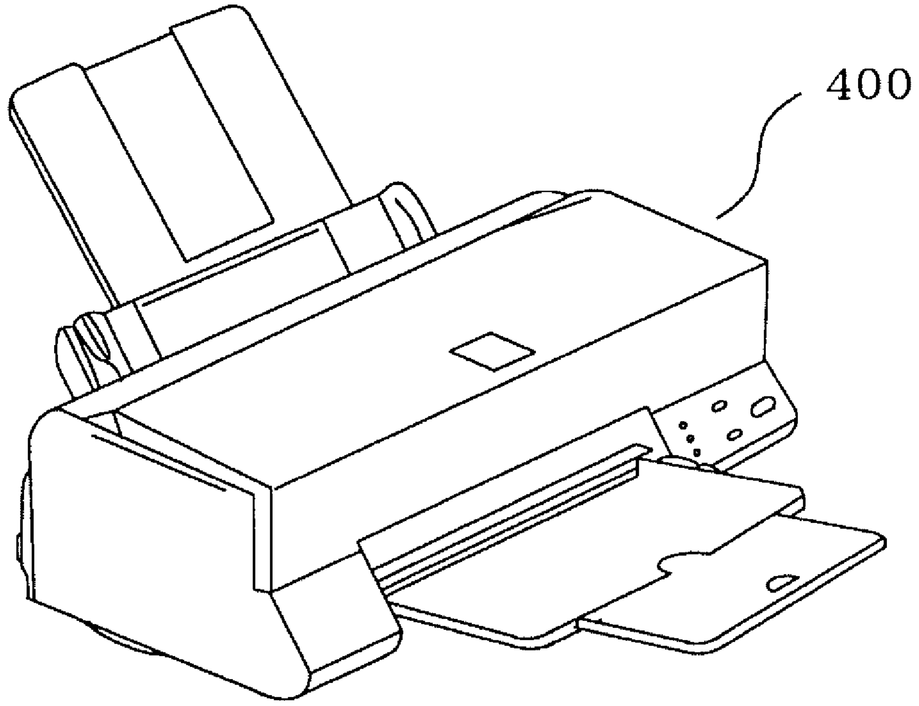
FIG. 9 is a perspective view of an inkjet printer in which the inkjet head 10 of an embodiment of the present invention is used.

A method for manufacturing a nozzle substrate, and a method for manufacturing an inkjet head are described in the embodiments above, but the present invention is not limited to the embodiments described above, and various modifications can be made within the scope of the technical concepts of the present invention. The inkjet head 10 manufactured in the manner described above may be used in the inkjet printer 400 shown in FIG. 9, as well as in a droplet discharge device that is used in various applications such as manufacturing a color filter for a liquid crystal device, forming a light-emitting portion of an organic EL display device, and manufacturing a microarray of a biomolecular solution used in genetic screening or the like This can be achieved by changing the liquid material to be discharged from the nozzle holes 11

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A method for manufacturing a nozzle substrate comprising:

forming a first hollow recess in a first surface of a silicon substrate;

forming a liquid-resistant protective film having liquid-resistant properties on an entire surface of the first surface of the silicon substrate including an inner wall of the first hollow recess;

forming a second hollow recess in a first surface of a glass substrate;

bonding the first surface of the silicon substrate and the first surface of the glass substrate by anodic bonding so that the first hollow recess and the second hollow recess face each other;

reducing a thickness of the glass substrate from a second surface of the glass substrate until an aperture is formed in a bottom surface of the second hollow recess to form a second nozzle hole disposed on a droplet feed side of the nozzle substrate; and reducing a thickness of the silicon substrate from a second surface of the silicon substrate until an aperture is formed in a bottom surface of the first hollow recess to form a first nozzle hole disposed on a droplet discharge side of the nozzle substrate.

2. The method for manufacturing a nozzle substrate according to claim 1, wherein the reducing of the thickness of the silicon substrate is performed in a state in which a support substrate is affixed to the second surface of the glass substrate.

3. The method for manufacturing a nozzle substrate according to claim 1, wherein the reducing of the thickness of the glass substrate includes reducing the thickness of the glass substrate to a prescribed thickness that allows the glass substrate to act as a support substrate when the thickness of the silicon substrate is reduced, and the reducing of the thickness of the silicon substrate is performed in a state in which the glass substrate acts as the support substrate.

4. The method for manufacturing a nozzle substrate according to claim 1, further comprising forming a liquid-resistant protective layer on the second surface of the silicon substrate after the thickness of the silicon substrate is reduced, and forming a liquid-repellent film on an exposed surface of the liquid-resistant protective layer formed on the silicon substrate.

5. The method for manufacturing a nozzle substrate according claim 1, wherein the forming of the first hollow recess includes forming the first hollow recess in a cylindrical shape and the forming of the second hollow recess includes forming the second hollow recess in a cylindrical shape, with the first hollow recess having a smaller diameter than the second hollow recess so that a nozzle hole having the first nozzle hole and the second nozzle hole is formed in a cross-sectional stepped shape in which a cross-sectional area decreases in a stepwise fashion from the droplet feed side toward the droplet discharge side.

6. The method for manufacturing a nozzle substrate according to claim 1, wherein the reducing of the thickness of the silicon substrate includes grinding the silicon substrate from the second surface of the silicon substrate.

7. The method for manufacturing a nozzle substrate according to claim 1, wherein the reducing of the thickness of the silicon substrate includes wet etching the silicon substrate from the second surface of the silicon substrate.

8. A method for manufacturing a droplet discharge head having a nozzle substrate including a plurality of nozzle holes for discharging droplets, a cavity substrate including a plurality of pressure chambers for accommodating droplets with the pressure chambers respectively communicating with the nozzle holes of the nozzle substrate, and a pressure generation unit that imparts pressure variation to the pressure chambers to cause the droplets to fly out, the method comprising:

forming the nozzle substrate according to the method for manufacturing a nozzle substrate as recited in claim 1; and bonding the nozzle substrate and the cavity substrate by anodic bonding.

* * * * *